United States Patent [19]

Gelula

[11] Patent Number: 4,602,406
[45] Date of Patent: * Jul. 29, 1986

[54] COUPLING SYSTEM WITH CABLE

[76] Inventor: Jerome D. Gelula, 535 E. 86th St., New York, N.Y. 10028

[*] Notice: The portion of the term of this patent subsequent to Feb. 18, 2003 has been disclaimed.

[21] Appl. No.: 758,614

[22] Filed: May 28, 1985

Related U.S. Application Data

[63] Continuation of Ser. No. 639,981, Aug. 31, 1984, Pat. No. 4,570,310.

[51] Int. Cl.$^4$ .............................................. A44B 17/00
[52] U.S. Cl. ........................................ 24/645; 24/631; 24/634; 24/635; 24/648
[58] Field of Search ................. 24/645, 631, 634, 635, 24/648, 632, 32 WL, 134 KB, 115 G; 292/341.17

[56] References Cited

U.S. PATENT DOCUMENTS

| | | | |
|---|---|---|---|
| 2,153,077 | 4/1939 | Clarke | 24/645 |
| 2,248,005 | 7/1941 | Lyman | 24/645 |
| 2,970,796 | 2/1961 | Ross | 24/632 |
| 3,090,092 | 5/1963 | Szemplak et al. | 24/648 |
| 3,146,846 | 9/1964 | Gutshall | 24/645 |
| 3,196,824 | 7/1965 | Howard | 24/632 |
| 3,311,188 | 3/1967 | Gutshall | 24/603 |
| 3,564,672 | 2/1971 | McIntyre | 24/632 |
| 3,713,192 | 1/1973 | Wallin | 24/645 |
| 4,317,263 | 3/1982 | Föhl | 24/635 |
| 4,361,939 | 12/1982 | Gelula et al. | 24/631 |

FOREIGN PATENT DOCUMENTS 552420  1/1958  Canada .................................. 24/645

Primary Examiner—Victor N. Sakran
Attorney, Agent, or Firm—Paul J. Sutton

[57] ABSTRACT

The present invention discloses an improved coupling system capable of releasably joining and two or more of a variety of cooperative male/female mating items to be temporarily joined and released by a remotely positioned operator by means of a cable connected to the male member. Spring-biased positive forces within the female assembly otherwise tending to separate the male/female members are used to reliably capture the male component. A relatively small adjustable triggering force activated by the cable moving an activating pin triggers ejecting movement of the female capturing members. The male member forms a cavity containing gripping members that slidably grip the cable. The cavity is accessible to the operator.

1 Claim, 7 Drawing Figures

COUPLING SYSTEM WITH CABLE

This is a continuation of application Ser. No. 639,981, filed Aug. 13, 1984 now U.S. Pat No. 4,570,310.

The present invention relates generally to couplings and more specifically to a latching system capable of use in any number of various environments. In particular, the present system is an improved system over the coupling, or latching, system described in my U.S. Pat. No. 4,361,939 issued Dec. 7, 1982 and entitled "Coupling System."

The coupling system set forth in my prior patent '939 is applicable to operation from a position remote from the coupling system. One example of an application for the coupling system of my prior patent is for joining the supporting corner of a sail of a ship with a fixture at the top of a mast where it is desired not to keep the halyard in tension or where a fixed sail location is desired. In such case, a remotely operated cable-type release as described in my patented system is possible and desirable.

This is not to say, however, that the remotely operated system described in my prior patent leaves no room for improvement. The coupling system is situated in places extremely difficult for an operator to gain access to, with this provision being the very purpose behind the unigue features of the invention. To be more specific, the reader is directed to FIG. 22 of my patent '939, which illustrates my prior invention. FIG. 22 is an isolated view of the ball member 172 of the coupling system with the capturing members not shown. A cavity is shown formed within ball members 172 with a cable 170 looped around and over anchor pins 174 and activating pin 175 respectively. As cable 170 is pulled by a remotely situated operator, loop 173 of the cable is tautened so as to force actuating pins 175 downwords against locking member 176. Although the operation of the apparatus shown is good, it has become apparent that a certain sliding of cable 170 about anchoring pins 174 and about the head of actuating pin 175 can decrease the efficiency of the apparatus. It is to be noticed particularly that if cable 170 rolls about the head of pin 175 it could even roll off the head. In any case, the firmness of the grip of cable 120 against the head is directly related to the force of the pressure applied by the cable via actuating pin 175 to locking member 176. In addition, although the apparatus shown in FIG. 22 can be assembled in the place of manufacture, it is desirable that access be given to the cavity within the ball member to repair the cable or the pins.

With the above discussion of the advantages of my prior invention and of its areas that leave room for improvement in mind, the present invention is provided with the object of making my prior invention more efficient, more reliable, and more responsive to remote operation.

It is another object of the present invention to provide a remotely controlled coupling system with the male connector member being provided with a cable engaged with the head of the actuating pin so as to fully concentrate the force exerted by the cable against the pin and thus the pressure against the locking member positioned in the female component of the system.

It is a further object of my invention is to provide a coupling system with a male connector having a cavity with anchoring pins with heads that provide guidance for the cable.

It is another object of my invention to provide a coupling system having a male connector member having a convenient access port to the cavity of the male connector member, the cavity containing a remotely operated cable loop in contact with an actuating pin.

In accordance with the above objects, I describe herein a coupling, or latching system that is directed to be an improvement over my U.S. Pat. No. 4,361,939. The improved latching system comprises a supporting structure; at least one female jaw member, or capture member, supported for movement between capturing and releasing positions by the supporting structure; first spring means carried by the supporting structure normally biasing the capture member towards the releasing position; a locking member for the capture member supported for movement between interfering and non-interfering positions by the supporting structure, wherein in the interfering position the capture member is in the capturing position and in the non-interfering position the capture member is in the releasing position; second spring means carried by the supporting structure normally biasing the locking member toward the interfering position; connector means adapted to be releasably captured by the capture member in the capturing position, the connector means forming an internal cavity; cable means having portions thereof disposed within the cavity for influencing the locking member from a position remote from the locking member; anchor pin means disposed within the cavity for guiding portions of the cable means; actuating means disposed within the cavity and extending from the connector member and movable from a non-release position to a release position in response to movement of the cable means, the locking member being movable to the non-interfering position in response to movement of actuating means to the release position; third spring means carried by the connector means normally biasing the actuating means to the non-release position; and gripping means carried by the connector means and imposed within the cavity for holding the cable means against the top portion of the actuating member. The connector means defines an aperture to the cavity. The gripping means includes a horizontal pin member secured to the connector means and horizontally disposed within the cavity to a position spaced over the actuating means wherein a gripping space is formed between the pin member and the actuating means adapted to accept a portion of the cable means. The actuating means includes a vertical cylindrical pin portion and a top head portion, the horizontal pin portion being positioned over the head portion, wherein the gripping space is defined by the horizontal pin member and the head portion. The head portion is generally cylindrical and larger in diameter than the pin portion, the head portion forming a pair of opposed grooves adapted to slidably hold portions of the cable means. The third spring means preferably is a helical spring positioned in the cavity around the pin portion of the actuating means between the head portion and the connector means. The cavity is defined by a rear wall, a pair of side walls, and opposed top and bottom walls, the anchor pin means including a pair of anchor pins horizontally extending from the rear wall into the cavity proximate to the bottom wall and each of the side walls. The anchor pins are approximately parallel with the pin portion of the actuating means. The anchor pins include cylndrical bodies and anchor pin heads larger in diameter than the pin bodies, the anchor pin heads being positioned adjacent to the bottom wall and to the side walls of the cavity. The cable means includes a cable strand member positioned in the cavity over the head portion and in the grooves of the actuating means and extending under the pin bodies of the anchor pins, whereby the cable strand member is slidably held in position between the horizontal pin member and the head portion in the grooves of the head portion and by the pin bodies and said anchor pin heads. The connector means is preferably a cylindrical member and the aperture is generally transverse to the axis of the cylindrical member; and the horizontal pin member of the gripping means and the anchor pins are generally lateral to the axis of the cylindrical member. The cable strand forms a cable loop with the gripping space and the anchor pins that is generally parallel with the aperture of the cavity and orthogonic with the horizontal pin member and the anchor pins. The hallow of the capture member is partly cylindrical wherein the cylindrical connector member is adapted to be held in the bottom in the capturing position. The at least one capture member is preferably a pair of capture members forming opposed partly cylindrical hollows.

The foregoing objects and features of the present invention will be more apparent from a reading of the following technical specification wherein similar reference characters are used in conjunction with the several views of the drawings.

DESCRIPTION OF THE PREFERRED EMBODIMENT

Reference is now made in detail to the drawings.

Figure 1:
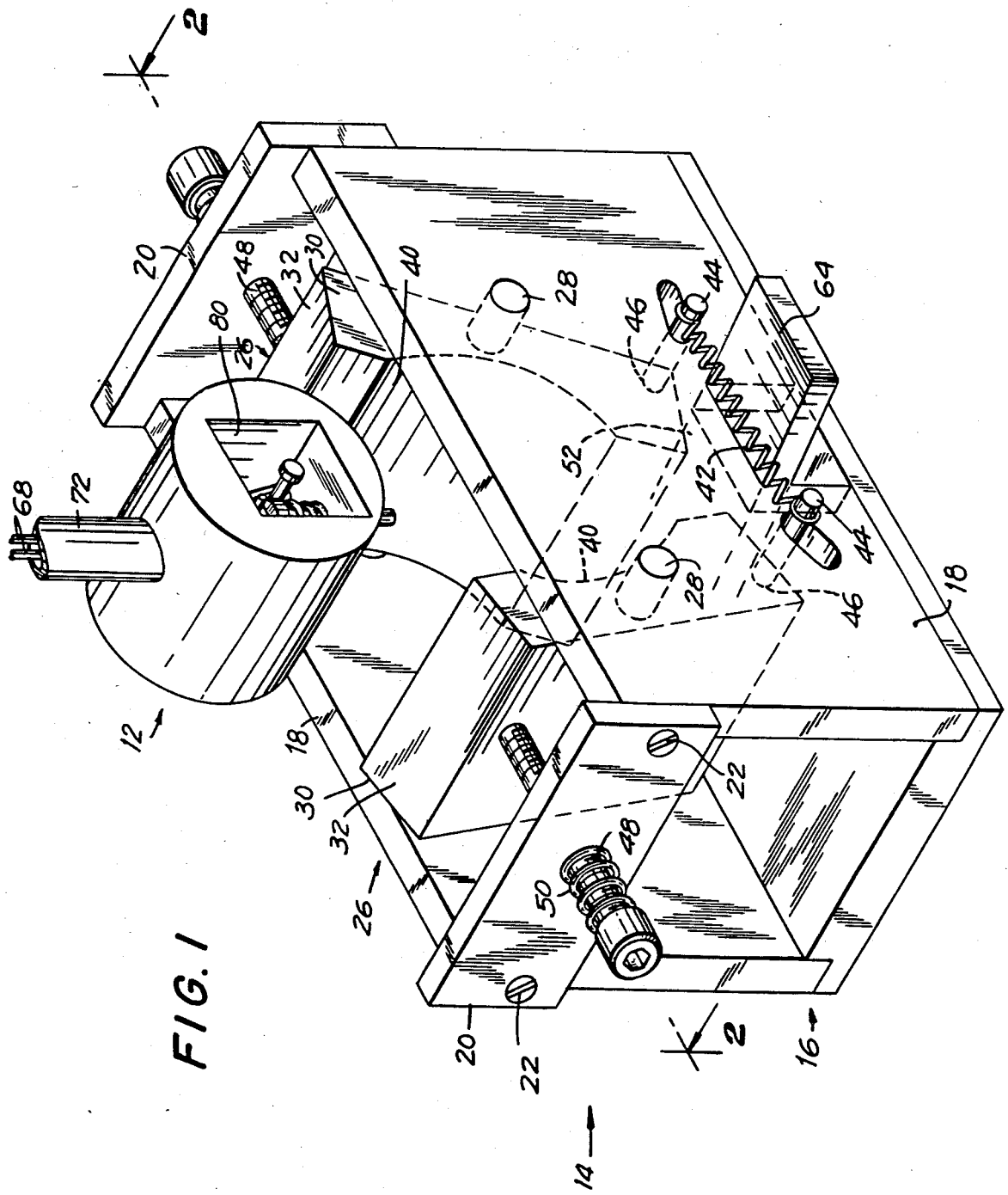
FIG. 1 is a perspective view of the coupling system showing the male connector member being lowered into the female connector assembly.

A coupling system 10 shown in a perspective view in FIG. 1 illustrates a generally cylindrical male connector member 12 descending towards engagement with a female connector assembly 14. Female connector assembly 14 includes a support structure 16 that includes an opposed pair of parallel upright side walls 18 and an opposed pair of end wall portions 20 secured by bolts 22 to the top portions of the ends of side walls 20 with side walls 18 being secured to a horizontal bottom wall 24 seen in section in FIGS. 2, 3, and 4. Female connector assembly 14 further includes a spaced pair of female jaw members 26 that are rotatably mounted on a pair of horizontal-parallel pin embers 28 that orthoganally span side walls 18.

Each female jaw member 26 includes an opposed pair of side walls 30 opposed top and bottom walls 32 and 34 respectively, an outer end wall generally perpendicular to side walls 30 and top and bottom walls 34, and an inner wall 38 opposed to outer end wall 36. Each inner wall 38 forms a partly circular hollow 40 that extends horizontally so that both hollows 40 are adapted to receive and grip, or capture, male connector member 12 which has its cylinder axis horizontally aligned.

Figure 2:
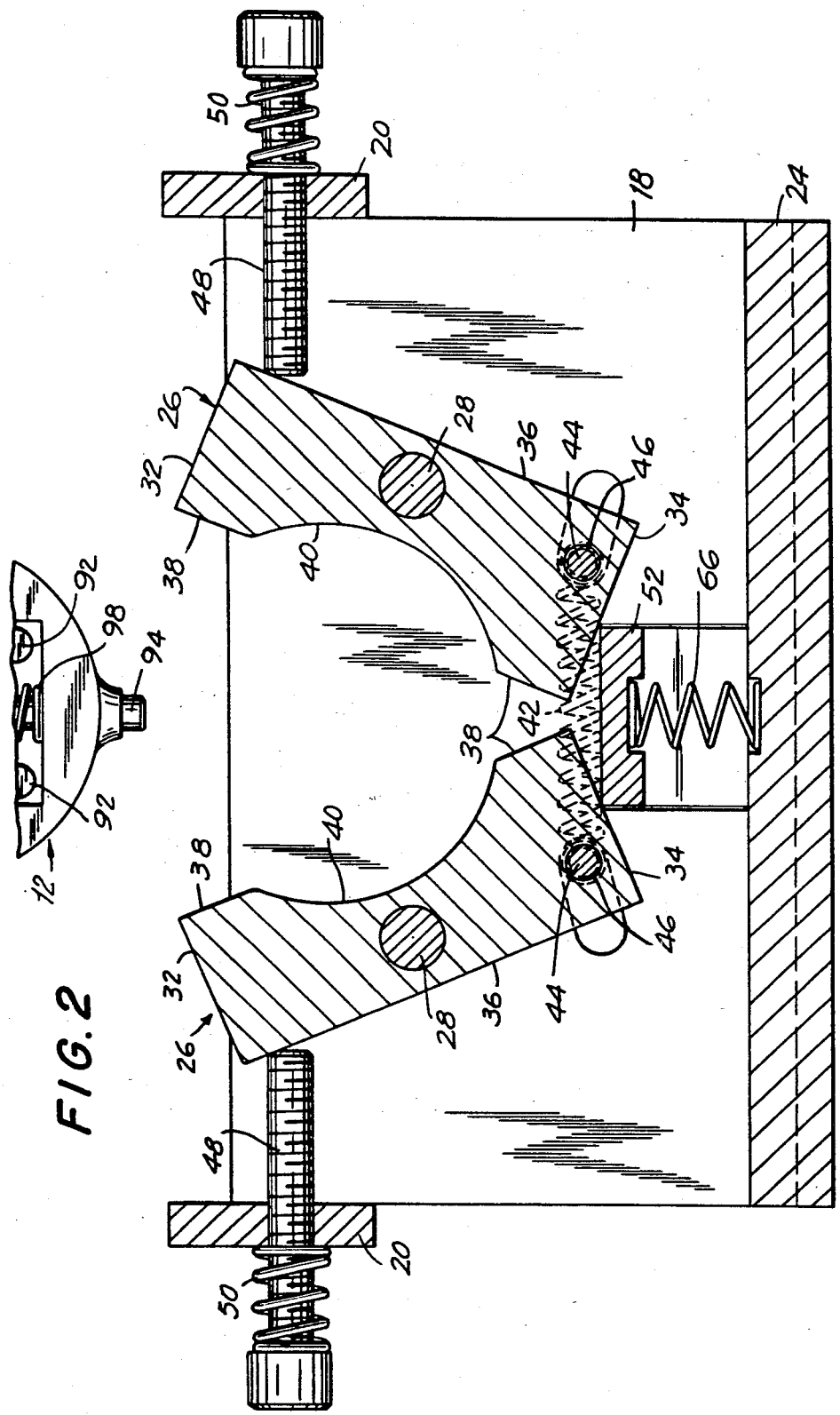
FIG. 2 is a sectional view of the female connector assembly taken through plane 2—2 of FIG. 1.

Female jaw members 26 are shown in their unlocked mode in FIGS. 1 and 2 where their bottom portions are nearer to one another than their upper portions. The unlocked mode is maintained by a horizontally aligned expansion spring 42 seen in its unbiased mode n FIGS. 1 and 2. Spring 42 is connected at each of its ends to a pair of connecting pins 44 horizontally outwardly extending from the lower portions of one of the side walls 30 of jaw members 26. As seen in FIG. 1, connecting pins 44 pass through a pair of slots 46 formed in side walls 18 so that expansion spring 42 is positioned outside of side walls 30 from female connector assembly 14. Slots 46 permit pins 44 to move laterally when female jaw members 26 rotate about pins 28. A pair of alaligning pins 48 extend horizontally and perpendicularly through end wall portions 20 inwardly into support structure 16 with their inner ends in pressing contact with outer end walls 36 so that jaw members 26 are prevented from rolling to an almost horizontal inclination in their unlocked mode by spring 42. Aligning pins 48 are threadably mounted through threaded holes in end wall portions 20 so that the aligning pins can be adjusted inwardly towards or outwardly from jaw members 26 in order to position the jaw members at a desirable inclination that is best for operatively capturing male connector member 12. Aligning pins 48 are preferably provided with compression springs 50 that are disposed around the aligning pins between end wall portions 20 and pin heads provided at the outer ends of the aligning pins. As aligning pins 48 are threaded inwardly, springs 50 are increasingly compressed by the pin heads Into an increasingly biased mode that makes further inward threading increasingly difficult. The increased bias at springs 50 adds to the stiffness of aligning pins 48 as the pins extend away from the inner surface of end wall portions 20.

Figure 3:
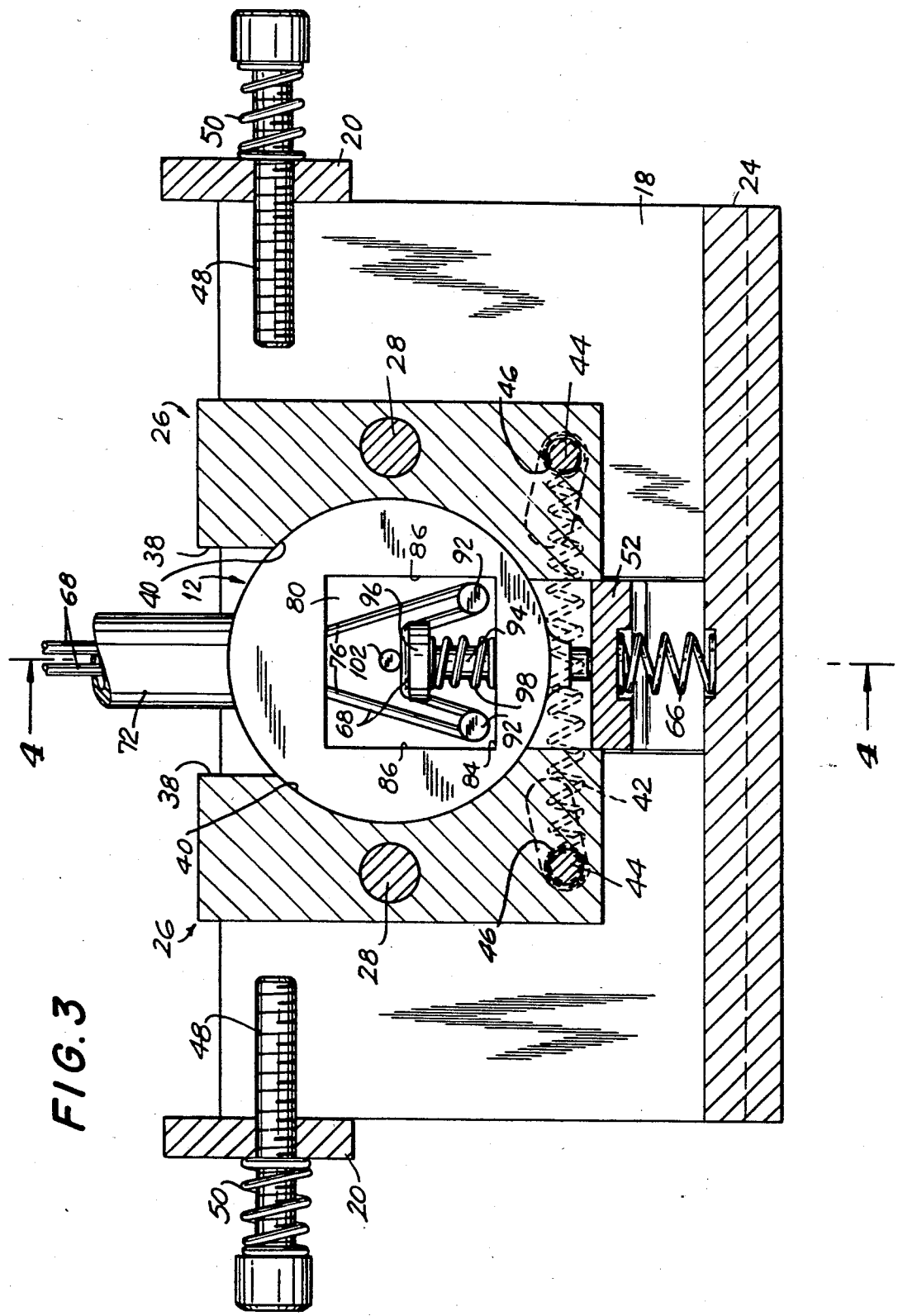
FIG. 3 is a front sectional view of the coupling system in a capturing position.
Figure 4:
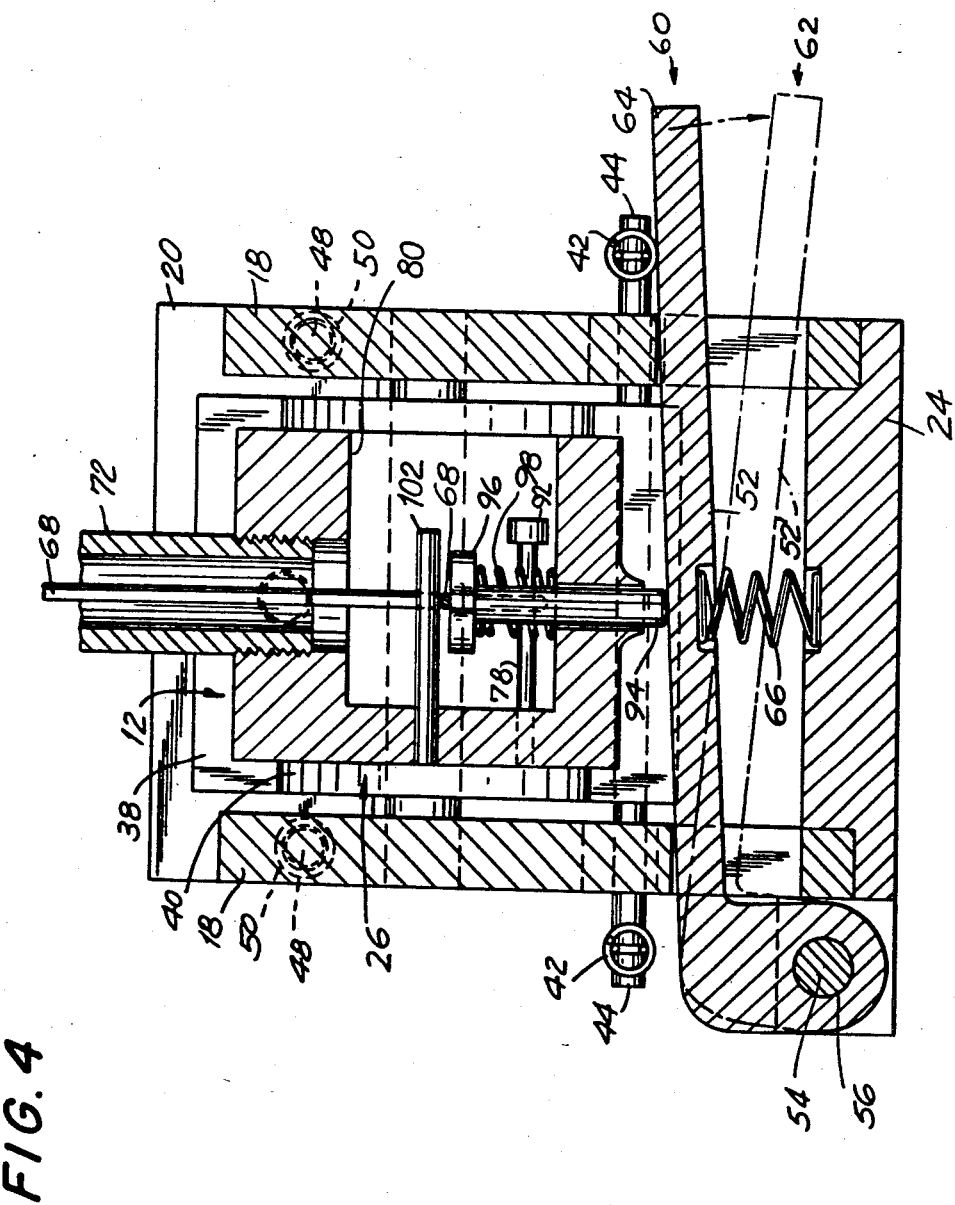
FIG. 4 is a sectional side view of the coupling system in a capturing position.

FIGS. 3 and 4 illustrate coupling system 10 in its locked mode with female jaw members 26 in a generally upright position with facing inner walls 38 being aligned generally parallel one to another. Male connector member 12 is captured by jaw members 26 in hollows 40. In addition and elongated locking member 52 is positioned between the lower portions of jaw members 26 in pressing contact with inner walls 38 caused by expansion spring 42 which has been forced into a biasing mode that pulls the bottom portions of jaw members 26 towards one another. Locking member 52 is transversely disposed between side walls 18 of support structure 16. As shown in the sectional side view of FIG. 4, one end of locking member 52 is rotatably connected at a connecting pivot pin 54 that extends through a downwardly extending flange portion 56 of locking member 52 and an extending bottom portion 58 that extends outwardly from a side wall 18 of support structure 16. As hown in FIG. 4, locking member 52 is rotatably movable about pivot pin 54 between a generally upward locking position 60 between jaw members 26 wherein jaw members 26 are in their locked mode and a generally downward unlocking position 62 shown in phantom lines in FIG. 4 free of jaw members 26, that is, wherein jaw members 26 are free to rotate inwardly towards one another in their unlocked mode seen in FIGS. 1 and 2. The angular inclination of locking member 52 extends slightly upwardly from pivot member 54 to its locking position 60 where the outer portions of inner walls 38 of jaw members 26 impinge upon locking member 52 slightly downwardly from pivot pin 54 in its unlocking position 62. Locking member 52 includes a tongue portion 64 that extends outwardlly beyond a side wall 18 of support structure 16 opposite pivot in 54. Tongue portion 64 is adapted to be pressed downwardly by an operator from its locking mode 60 to its unlocking mode 62.

A helical compression spring 66 is disposed between circular cavities formed in the center ortions of bottom wall 24 of support structure 16 and the undersurface of locking member 52. Locking member 52 is forced upwardly by the bias of compression spring 66 when locking member 52 is in its downward unlocking mode 62. Locking member 52 is forced downwardly so that spring 66 becomes upwardly biased when tongue 64 is forced downwards by an operator.

In a preliminary sequence of operations, it is noted that when male connector memmber 12 is pressed downwards into hollows 40 of jaw members 40, jaw members 40 are pressed apart into their locking mode as seen in FIGS. 3 and 4. Bottom walls 34 of jaw members 26 press against the top of locking member 52 as the jaw members are rotated to their locking mode by the pressure of male connector member 12 in hollows 40. Once inner walls 38 pass past locking member 52, compression spring 66, which had been pressed downwardly into its unlocking position, presses locking member 52 upwards into its locking position between jaw members 26 as described previously and as shown in FIGS. 3 and 4. At this point, it can be said that when the operator presses downwardly on tongue portion 64 so as to release jaw members 26 from their inwardly pressing contact with locking member 52, male connector member 12 is released from its captured mode in hollows 40. Jaw members 26 will be snapped towards one another at a force related to the force exerted by the bias of expansion spring 42, a force which can be varied within desired limits.

With the above general operational sequence in mind, the reader is directed to my U.S. Pat. No. 4,361,939 and in particular to FIG. 22 of that patent and to the description set forth in that patent relating to FIG. 22, namely page 13, lines 12–42, and page 14, lines 1–3, which are to be considered a part of the present application.

Figure 6:
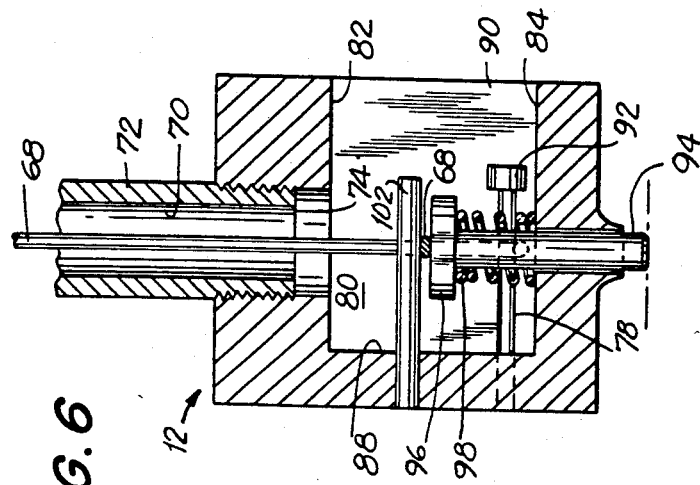
FIG. 6 is a sectional view taken through line 6—6 of FIG. 5.
Figure 7:
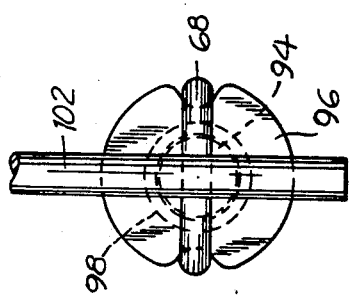
FIG. 7 is a top view of the head of the actuating pin.
Figure 5:
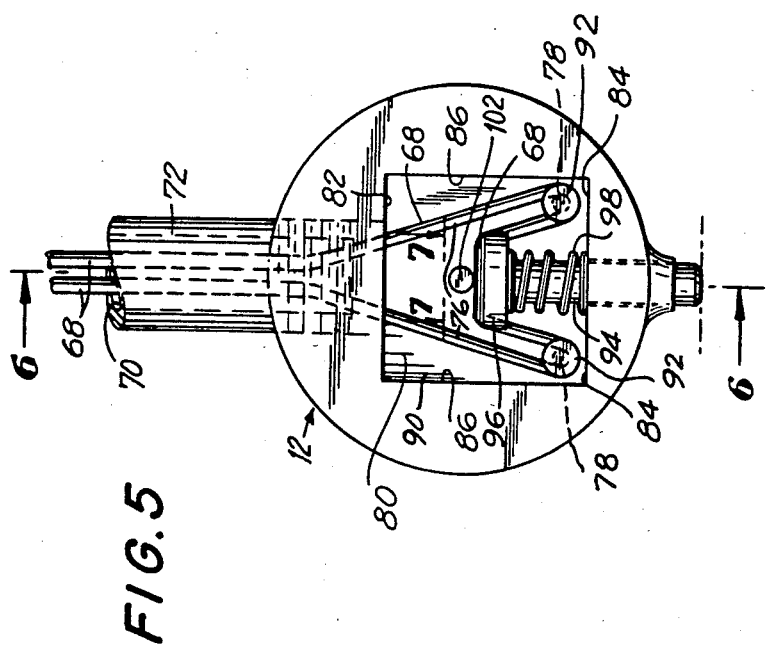
FIG. 5 is a from view of the male connector assembly.

As also described therein, a coupling such as coupling system 10 as described herein can be made able to remotely release the coupling from a desired location space from the coupling itself. For example, the coupling or latch according to the present invention may be used to join the supporting corner of a sail with a fixture at the top of a mast, for example, where it is desired to keep the halyard in tension or where a fixed sail location is desired. In such cases a cable-type release in the form of a cable 68 is shown in FIGS. 1–5 and in particular in FIGS. 5 and 6 leading into a central bore 70 formed within a cylindrical sheath 72 that in turn is threaded into a threaded hole 74 formed at the center portion of the top of cylindrical male connector member 12. Cable 68 leads from bore 70 to a cavity 80 formed in male connector member 12 and extends to a cable loop 76 that is mounted to two anchor pins 78 mounted in cavity 80. Cavity 80 shown as generally quadrilateral is defined by opposed top and bottom walls 82 and 84 respectively, opposed side walls 86, and a rear wall 88. It is noted that cable loop 76 is generally axially transverse with male connector member 12. An aperture 90 is formed opposite rear wall 88 so that cavity 80 extends generally along the axial area of cylindrical male connector member 12 with the axis being generally aligned with the center of aperture 90. The outer surface of rear wall 88 and the outer surfaces of top, bottom, and side walls 82, 84, and 86 defining aperture 90 are flat and generally vertical. Anchor pins 78 are secured to rear wall 88 and extend along the axial length of connector member 12 within cavity 80 proximate to bottom wall 84 and side walls 86. Pin heads 92 at the outer ends of anchor pins 78 lie against bottom wall 84 spaced inwardly from aperture 90. A vertical actuating pin 94 extends upwardly through bottom wall 84 into cavity 80. Actuating pin 94 is provided with a cylindrical head 96. A compression spring 98 encircles actuating pin 94 between head 96 and bottom wall 84. Spring 98 is shown upwardly extended in its biased mode in FIGS. 5 and 6. The bottom end of actuating pin 94 is positioned in contact with the top of locking member 52 as seen in FIGS. 3 and 4. Loop 76 of cable 68 passes under one of anchor pins 78, then upwardly and over the top surface of pin head 96, then downwardly from pin head 96 and under the other of anchor pins 78, then upwardly from the other anchor pin 78 to and through bore 70 where two strands of cable 68 exist side by side. The double strand of cable 68 is direct to a control position for operation by an operator. The top of activating pin head 94 is seen in isolation in FIG. 7 with opposed vertical grooves 100 formed in the sides of the pin head for positioning cables 68.

In accordance with the present invention, a horizontal gripping pin 102 connected to rear wall 88 of male connector member 12 extends axially in relation to male connector member 12 into cavity 80 to a position over and spaced from actuating pin head 94 and transversely pressing down upon a portion of cable loop 76 of cable 68 which is wedged between gripping pin 102 and head 94. Thus, cable 68 is held in a relatively non-slidable operating position by anchor pins 78 and their heads 92, actuating pin head 96 and its grooves 100, and gripping pin 102 pressing down upon cable 68.

In operation, male connector head 12 is pressed into female connector assembly 14, and particularly between jaw members 26 so that jaw members 26 rotate to capture male connector head 12 in hollows 40. Locking member 52 is at the same time biased upwards by compression spring 66 into locking engagement between jaw members 26 so as to keep coupling system 10 in the locked mode as seen in FIGS. 3 and 4. In order to release coupling system 10 from the locked mode, the operator, who is at a distance from the coupling system, pulls on at least one strand of cable 68 so that loop 76 becomes taut thus actuating pin 94 is forced downwards against the bias of compression spring 98, which ordinarily keeps actuating pin 94 in a raised positions. The bottom of actuating pin 94 is forced against the top of locking member 52 so as to force the locking member against the bias of its spring 98 from its locking engagement between jaw members 26 and free the jaw members to be rotated by spring 42 into their unlocked mode and so to eject and free male connector member 12 from its locking engagement with female connector assembly 14.

Alternatively, when coupling system 10 is available to be reached by an operator, downward pressure upon tongue portion 64 of locking member 52 will also act to release jaw members 26 from their locking mode by biasing action of spring 42 so that male connector member is ejected and freed from engagement with the jaw members.

The coupling system of the invention has been described with reference to one embodiment and application, but it is to be appreciated that there are numerous other applications in which the invention may be used and other embodiments of the invention which may differ from the disclosed preferred embodiment without departing from the spirit and scope of the invention which is defined in the following claims.

What is claimed is:

1. An improved latching system, comprising, in combination;

a supporting structure, at least one capture member supported for movement between capturing and releasing positions by said supporting structure, first spring means carried by said supporting structure normally biasing said capture members towards said releasing position, a locking member for said capture member supported for movement between interfering and non-interfering positions by said supporting structure, wherein in said interfering position said capture member is in said capturing position and in said non-interfering position said capture member is in said releasing position, second spring means carried by said supporting structure normally biasing said locking member toward said interfering position, connector means adapted to be releasably captured by said capture member in said capturing position, said connector means forming an internal cavity, cable means having portions thereof disposed within said cavity for influencing said locking member from a position remote from said locking member, anchor pin means disposed within said cavity for guiding portions of said cable means, actuating means disposed within said cavity and extending from said connector member and movable from a non-release position to a release position in response to movement of said cable means, said locking member being movable to said non-interfering position in response to movement of said actuating means to said release position, third spring means carried by said connector means normally biasing said actuating means towards said non-release position, and gripping means carried by said connector means and disposed within said cavity means for holding said cable means against the top portion of said actuating member, said connector means defining an aperture to said cavity, said gripping means including a horizontal pin member secured to said connector means and horizontally disposed within said cavity to a position spaced over said actuating means wherein a gripping space is formed between said pin member and said actuating means adapted to accept a portion of said cable means, said actuating means including a vertical cylindrical pin portion and a top head portion, said horizontal pin portion being positioned over said head portion, said gripping space being defined by said horizontal pin member and said head portion, said head portion being generally cylindrical and larger in diameter than said pin portion, said head portion forming a pair of opposed grooves adapted to slidably hold portions of said cable means, said third spring means being a helical compression spring positioned in said cavity around said pin portion of said actuating means between said head portion and said connector means, said cavity being defined by a rear pair of side walls, and opposed top and bottom walls, said anchor pin means including a pair of anchor pins horizontally extending from said rear wall into said cavity proximate to said bottom wall and each of said side walls, said anchor pins being approximately parallel with said pin portion of said actuating means, said anchor pins including cylindrical anchor bodies and pin heads larger than said pin bodies, said anchor pin heads being positioned adjacent to said bottom wall and said side walls of said cavity, said cable means including a cable strand member positioned in said cavity over said head portion and in said grooves of said actuating means and extending under said pin bodies of said anchor pins, said strand member being slidably held in position between said pin member and said head portion in said grooves of said head portion and by said pin bodies and said anchor pin heads, said connector means being a cylindrical connector member, said aperture being generally transverse to the axis of said cylindrical connector member; said horizontal pin member of said gripping means and said anchor pins being generally lateral to said axis of said cylindrical connector member, said cable strand member forming a cable loop with said gripping space and said anchor pins being generally parallel with said aperture of said cavity and orthogonic with said horizontal pin member and said anchor pins, said hollow of said capture member being partly cylindrical, said cylindrical connector member being adapted to be held in said hollow in said capturing position, said at least one capture member having a pair of capture members forming opposed partly cylindrical hollows, said cylindrical connector member being movable back and forth in directions transverse with respect to the axis of its length a distance which is predetermined and limited by the surfaces defining the opening within which it is disposed, said cable means capable of being manipulated by the user of the latching system to effect releasing of said capture member by increasing tension in the cable means to a predetermined and desired magnitude.

* * * * *